Jan. 14, 1969   F. J. ADAMS   3,421,387

RACK AND PINION ASSEMBLIES

Filed May 4, 1966

Inventor:
Frederick John Adams
By Pierce, Scheffler & Parker
his Attys.

United States Patent Office 3,421,387
Patented Jan. 14, 1969

3,421,387
RACK AND PINION ASSEMBLIES
Frederick John Adams, Campton, near Shefford, England, assignor to Cam Gears Limited, Luton, England, a company of Great Britain
Filed May 4, 1966, Ser. No. 547,636
Claims priority, application Great Britain, May 4, 1965, 18,679/65
U.S. Cl. 74—498  8 Claims
Int. Cl. B62d 1/20

ABSTRACT OF THE DISCLOSURE

A rack bar and pinion construction where the rack bar is supported on the side thereof remote from the rack teeth and also on both lateral sides of the bar to maintain the rack bar teeth in good meshed engagement with the pinion. The support member for the rack bar is slidably mounted in the pinion housing and carries an anti-friction roller, ball, reel, spool, cylinder or the like to provide free rolling engagement with the rack bar thereby reducing friction.

---

This invention relates to rack bar and pinion assemblies and is particularly suitable for rack bar and pinion assemblies of the kind as used in steering gears.

A rack bar and pinion assembly of the kind with which the present invention is concerned includes a pinion rotatively mounted in a pinion housing, a rack bar linearly movable through said pinion housing, a rack on said rack bar operatively connected with the pinion so that rotation of the pinion effects in movement of the rack bar through the pinion housing, and a support member on which the rack bar is supported in the pinion housing which support member is situated between the pinion housing and the rackbar and located at a position on the rack bar on the side remote from the rack.

Previously the support member has been in the form of a yoke with which the rack bar was in sliding contact. However, it is found that the frictional forces developed by sliding contact between the yoke and rack bar on this kind of assembly causes considerable wear to the relevant contact surfaces and thus reduces the efficiency of the rack bar and pinion assembly.

It is therefore an object of the present invention to provide a rack bar and pinion assembly of the kind specified in which the frictional forces developed by contact between the rack bar and support member are reduced, thereby relatively decreasing wear to the relevant contact surfaces to increase the efficiency of the assembly.

According to the present invention there is provided a rack bar and pinion assembly of the kind specified in which the support member is provided by a roller member rotatively mounted relative to the pinion housing so that movement of the rack bar through the pinion housing over the roller member causes sympathetic rotation of the roller member.

Further according to the present invention there is provided a steering gear which incorporates a rack bar and pinion assembly constructed according to the present invention.

It will be realized that the term roller member as used herein includes a ball, reel, spool, cylinder or the like.

Several embodiments of the present invention will now be described, by way of example only, and with reference to the accompanying diagrammatic drawings, in which.

Figure 1:
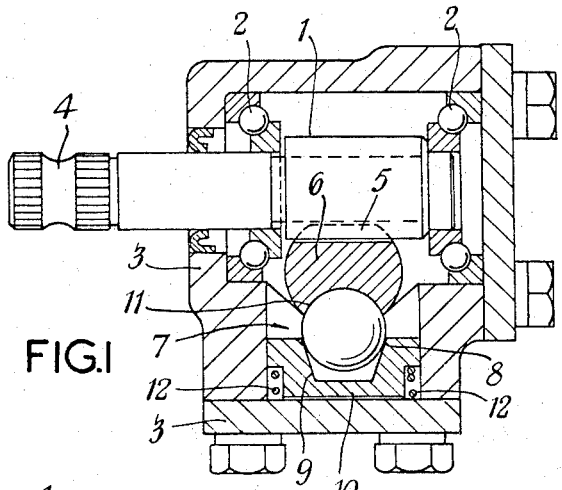
FIG. 1 illustrates a cross section taken normal to the longitudinal axis of the rack bar of a rack bar and pinion assembly according to the present invention in which the roller member is in the form of a ball.

Referring firstly to FIG. 1 which illustrates a rack and pinion assembly of the kind specified, a pinion 1 is rotatably mounted on bearings 2 in a pinion housing 3. The pinion 1 can be rotatably driven by a shaft 4. The pinion 1 engages with a rack 5 of a rack bar 6 so that rotation of the pinion 1 effects in linear movement of the rack bar 6 through the pinion housing 3 in the direction of rotation.

The rack bar 6 is provided with a support member indicated generally at 7 which in the present embodiment is in the form of a ball 8 located between a recess 9 in a ball carrier 10 and an axially extending complementary groove 11 in the rack bar 6. The groove 11 is formed in the rack bar 6 at a position diagonally opposite or on the side remote from the rack 5. The ball carrier 10 is resiliently mounted relative to the pinion housing 3 to bias the ball 8 towards and into contact with the rack bar 6. In the present examples the roller carrier is urged towards the rack bar 6 by spring means 12 located between the roller carrier and the pinion housing 3 to increase the support effected by the roller member. It will be realized that alternative resilient mountings, for example rubber, can be used.

In operation of the rack bar and pinion assembly illustrated in FIG. 1, as the rack bar 6 is moved through the pinion housing 3 by rotation of the pinion 1 the ball 8 rotates in sympathy with the rack bar 6 relative to the ball housing 10 whilst support is provided on the rack bar 6.

Figure 2:
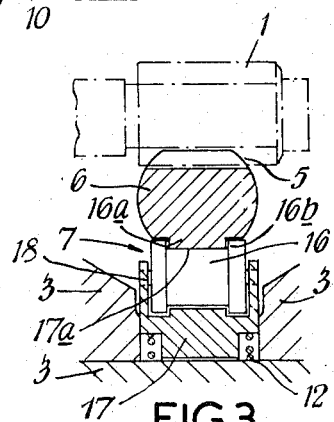
FIG. 2 illustrates a detail of a rack and pinion assembly similar to that illustrated in FIG. 1 in which the roller member is in the form of a spool.
Figure 3:
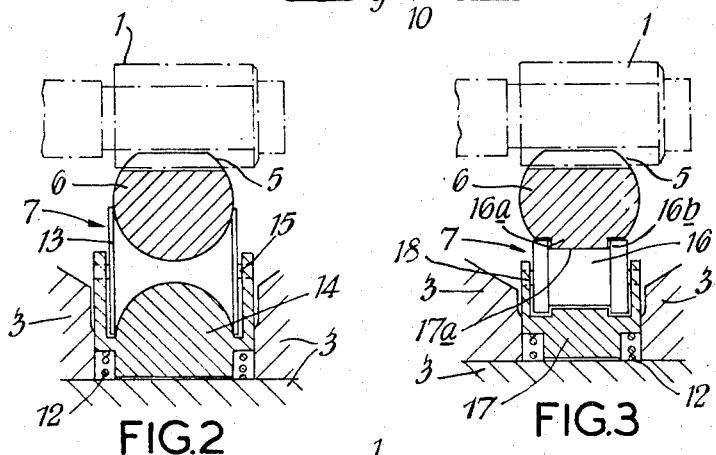
FIG. 3 illustrates a detail of a rack and pinion assembly similar to that illustrated in FIG. 1 in which the roller member is in the form of a reel.
Figure 4:
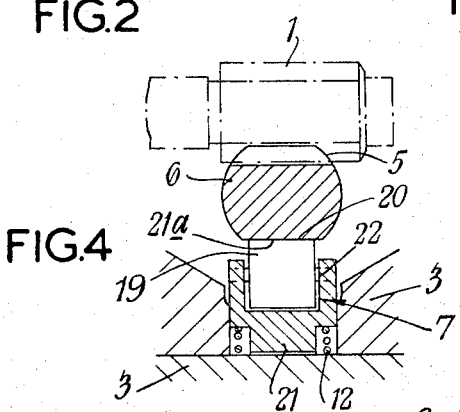
FIG. 4 illustrates a detail of a rack and pinion assembly similar to that illustrated in FIG. 1 in which the roller member is in the form of a cylinder.

In the embodiments illustrated in FIGS. 2 to 4, for convenience of description, similar parts of the rack bar and pinion assemblies are accorded the same reference numerals as used in the embodiment illustrated in FIG. 1.

Referring now to FIG. 2 the roller member is in the form of a spool 13 located between the rack bar 6 and a spool carrier 14 having a support surface for the spool. The spool 13 is mounted for rotation relative to the spool carrier 14 and if required the spool can be pinned at 15 for rotation about its axis to the spool carrier 14. It is possible to eliminate the pinning by suitably shaping the support surface of the spool carrier 14 on which the spool 13 is seated in the form of a saddle which is complementary to the saddle surface of the spool 13. It is seen that the concave form of the saddle surface of the spool 13 is complementary to the normal semi-circular form of the rack bar 6. The spool 13 is urged towards and contacts the rack bar 6 under the action of the spring means 12 and rotates during movement of the rack bar in the manner above described.

In FIG. 3 the roller member is in the form of a reel 16 which is located between the rack bar 6 and a reel carrier 17 having a support surface 17a. The peripheral recess 16b of the reel 16 engages with a complementary axially extending key-way 16a machined on the rack bar at the side remote from the rack 5. Similarly to the embodiment in FIG. 2 the reel 16 is mounted for rotation relative to the reel carrier 17 and if required the reel can be pinned at 18 to the reel carrier 17 for rotation about its axis. Conversely, the support surface 17a of the reel carrier 17 can be of arcuate cross-section to provide a concave surface complimentary to the convex surface of the reel 16 to retain the reel 16 without pinning.

In FIG. 4 the roller member is shown in the form of a cylinder 19 located between an axially extending flat 20 machined on the rack bar 6 and a cylinder carrier 21 having a support surface 21a. Similar to the embodiment shown in FIG. 3 the peripheral surface of the cylinder 19 abuts the flat 20 and the cylinder 19 can be pinned at 22 to the carrier 21 for rotation about its axis or conversely the support surface 21a of the carrier 21 can be of arcuate cross-section to provide a concave surface complementary to the convex surface of the cylinder 19 to retain the cylinder 19 during its rotation.

It will be realised that several modifications are possible to the above described embodiments without departing from the scope of the present invention for example, the rack bar can be of a cross section other than circular, the resilient mounting of the roller carrier can be of a form other than springs, either or both means as above described of retaining the roller member in the roller carrier (i.e. the pinning or the complimentary formation of the support surface) can be used as required.

1. In a rack bar and pinion assembly, a pinion housing, a pinion rotatably mounted in said housing, a rack bar linearly movable through said housing, a rack on said rack bar operatively connected with said pinion to move said rack bar linearly through the housing by rotation of said pinion, a rotatably mounted roller assembly including a roller member, a carrier member slidable in the housing supporting the roller member for rotation about an axis that is stationary relative to the carrier member and a spring acting on the carrier member, said roller assembly being situated between said housing and said rack bar on the side of the rack bar remote from said rack, said spring compressed between said housing and said carrier member to urge the roller assembly against said rack bar with the roller rotating in sympathy with the rack bar during movement of the rack bar through the housing over said roller member, and said roller asembly having surfaces engaging said rack bar on the side of the rack bar remote from said rack and on both lateral sides thereof to support the rack bar axially and laterally.

2. The assembly of claim 1 wherein said carrier member is slidably mounted in the pinion housing.

3. The assembly of claim 1 wherein the roller member is a ball mounted on the carrier member and the rack bar has an axially extending groove receiving said ball.

4. The assembly of claim 1 wherein the roller member is rotatably carried by the carrier member on a pin forming an axis of rotation for the roller member.

5. The assembly of claim 1 wherein the roller member rotates on a pin carried by the carrier member and the carrier member and pinned roller member coact to provide both axial and lateral support for the rack bar.

6. The assembly of claim 1 wherein the roller member is a spool with surfaces engaging the lateral sides and the side of the rack bar remote from the rack to support the rack bar both axially and laterally.

7. The assembly of claim 1 wherein the roller is a cylinder with a convex peripheral surface engaging both the lateral side and the sides of the rack bar remote from the rack to support the rack bar both axially and laterally.

8. In a vehicle steering gear assembly, a steering shaft, a pinion housing receiving said shaft, a pinion in said housing on said shaft and driven by the shaft, a rack bar meshed with said pinion, and means holding said rack bar in meshed engagement with said pinion including a slidably mounted carrier member in said housing, a rack bar support rotatably carried by said carrier member on a fixed axis, means urging said carrier member and support toward said rack bar to engage the side thereof remote from said pinion, and said support and carrier member coacting to provide both lateral and axial support for the rack bar.

References Cited

UNITED STATES PATENTS

| 3,347,109 | 10/1967 | Adams | 74—422 XR |
| 3,352,170 | 11/1967 | Adams | 74—498 XR |
| 1,332,161 | 2/1920 | Dahlen | 74—498 |
| 2,489,595 | 11/1949 | Spoor | 171—242 |
| 3,136,173 | 6/1964 | Masumi et al. | 74—422 |

FOREIGN PATENTS

| 811,463 | 4/1959 | Great Britain. |
| 1,077,545 | 3/1960 | Germany. |

FRED C. MATTERN, Jr., *Primary Examiner.*

BERNARD T. CALLAHAN, *Assistant Examiner.*